United States Patent
Freissler et al.

(10) Patent No.: US 7,621,296 B2
(45) Date of Patent: Nov. 24, 2009

(54) SEPARATION ELEMENT

(75) Inventors: Bernd Freissler, Dielheim (DE); Alexander Bubb, Schwetzingen (DE)

(73) Assignee: Prominent Dosiertechnik GmbH, Heidelberg (DE)

( * ) Notice: Subject to any disclaimer, the term of this patent is extended or adjusted under 35 U.S.C. 154(b) by 217 days.

(21) Appl. No.: 11/818,039

(22) Filed: Jun. 13, 2007

(65) Prior Publication Data
US 2008/0047882 A1    Feb. 28, 2008

(30) Foreign Application Priority Data
Jun. 16, 2006    (DE)    ........................ 10 2006 027 724

(51) Int. Cl.
*F16L 55/04*    (2006.01)
(52) U.S. Cl. ........................ 138/30; 138/104; 138/26; 220/721
(58) Field of Classification Search ............ 138/30, 138/26, 104; 220/721
See application file for complete search history.

(56) References Cited

U.S. PATENT DOCUMENTS

| | | | |
|---|---|---|---|
| 3,131,638 A | 5/1964 | Wilson et al. | |
| 4,167,201 A * | 9/1979 | Zahid | ........................... 138/30 |
| 4,428,401 A * | 1/1984 | Chun | ........................... 138/30 |
| 4,487,226 A * | 12/1984 | Chun | ........................... 138/30 |
| 4,881,876 A | 11/1989 | Laziou | |
| 5,732,740 A * | 3/1998 | Hornyack et al. | ............. 138/26 |
| 6,491,853 B1 | 12/2002 | Gaa et al. | |

FOREIGN PATENT DOCUMENTS

| | | |
|---|---|---|
| DE | 943739 | 5/1956 |
| DE | 3729726 | 3/1989 |
| DE | 9004560 | 8/1991 |
| DE | 19610581 | 9/1997 |
| EP | 0321338 B1 | 2/1991 |

* cited by examiner

*Primary Examiner*—Patrick F Brinson
(74) *Attorney, Agent, or Firm*—Michael L. Dunn

(57) ABSTRACT

A separation element of a multi-layer structure for pressure compensation including: at least two mutually superposed flexible, fluid-tight material layers; at least one spacer element which is arranged between the material layers and holds them at a spacing relative to each other, wherein the at least one spacer element is such that the space between the flexible, fluid-tight material layers is at least partly adapted for fluid to flow therethrough, and at an edge region of the multi-layer structure the separation element has a sensor region (S) which is in a communication with remaining space between the flexible, fluid-tight material layers through which fluid can flow, wherein within the sensor region, the flexible, fluid-tight material layers are designed so that, by virtue of an inflow of fluid between them, an increase of pressure causes an increase in the spacing between the material layers relative to each other.

22 Claims, 12 Drawing Sheets

SEPARATION ELEMENT

BACKGROUND OF THE INVENTION

This application claims priority from German Application 102006027724.4-24, filed Jun. 16, 2006.

The present invention concerns a separation element for a pressure compensation vessel, a pressure reservoir or a pulsation damper, in particular a safety separation element for such apparatuses, which has means for detecting and displaying a rupture location in such a separation element.

Pressure compensation vessels, pressure reservoirs and pulsation dampers are used for example in pipe conduit systems and hydraulic circuits in order to compensate for and/or damp fluctuations in pressure or volume therein. Pressure compensation vessels, pressure reservoirs and pulsation dampers usually comprise a housing in which two spaces or chambers are separated from each other in fluid-tight relationship (that is to say in liquid-tight and gas-tight relationship) by a flexible separation element. One of the two chambers is connected to the conduit system and filled with the liquid flowing in the conduit system (or a gas flowing in the conduit system). The second chamber usually contains a gas which is compressible and which can absorb fluctuations in pressure or volume in the first chamber by way of the flexible separation element. The separation element between the two chambers of a pressure compensation vessel, the pressure reservoir or a pulsation damper serves on the one hand to transmit fluctuations in pressure or volume and on the other hand to separate the different media in the chambers.

The separation elements which are known for pressure compensation vessels, pressure reservoirs and pulsation dampers usually comprise a flexible, fluid-tight diaphragm material such as for example various elastomers, PTFE and so forth and they can be of a single-layer or multi-layer structure. The known separation elements however all suffer from the common disadvantage that, in the event of a defect, for example when the flexible diaphragm material tears, the media from the first and the second chambers are mixed together and thus reliable operation of the pressure compensation vessel, the pressure reservoir or the pulsation damper is put at risk. Such a defect at the pressure compensation vessel, the pressure reservoir or the pulsation damper is usually established by way of the measurement of pressure fluctuations in the conduit system or in the gas-filled second chamber. That however means that a defect is detected only when the fluid-tight separation between the first chamber and the second chamber is no longer guaranteed and medium has passed across from the one chamber into the other chamber and the media have become mingled. The function of the separation element is thus already no longer implemented at the time of detection of a defect.

BRIEF DESCRIPTION OF THE INVENTION

The object of the present invention is to provide a separation element for pressure compensation, for example in a pressure compensation vessel, a pressure reservoir or a pulsation damper, which allows a defect to be detected at an early moment in time at which the function of the separation element is not yet adversely affected and thus replacement prior to loss of pressure compensation and mixing of fluids is possible.

That object is attained by a separation element for pressure compensation, e.g. in a pressure compensation vessel, a pressure reservoir or a pulsation damper, wherein the separation element is of a multi-layer structure with at least two mutually superposed flexible, fluid-tight material layers, and at least one spacer element which is arranged between the flexible, fluid-tight material layers and holds them at a spacing relative to each other. The at least one spacer element is such that the space between the flexible, fluid-tight material layers is adapted at least region-wise for fluid to flow therethrough, and wherein in a region, usually and edge region, of the multi-layer structure, the separation element has a sensor region which is in a communication through which fluid can flow with the remaining space between the flexible, fluid-tight material layers.

More particularly, alternatively described, the invention is a separation element for a pressure compensation in a pressure compensation vessel, pressure reservoir or pulsation damper, wherein the separation element is of a multi-layer structure including:

at least two mutually superposed flexible, fluid-tight material layers (1, 2), and at least one spacer element (3) which is arranged between the flexible, fluid-tight material layers and holds them at a spacing relative to each other, wherein the at least one spacer element is such that the space between the flexible, fluid-tight material layers (1, 2) is at least partly adapted for fluid to flow therethrough, and at an edge region of the multi-layer structure the separation element has a sensor region (S) which is in a communication with remaining space between the flexible, fluid-tight material layers through which fluid can flow, wherein within the sensor region, the flexible, fluid-tight material layers are designed so that, by virtue of an inflow of fluid between them, an increase of pressure causes an increase in the spacing between the material layers (1,2) relative to each other. Such increase in spacing may then be detected by any suitable means such as a mechanical measuring device, optics or electrical sensing, as an indication of failure of one of the material layers.

BRIEF DESCRIPTION OF THE DRAWINGS

FIG. 6b shows a cross section of further alternative embodiment of a lower fluid tight material layer of the separation element of the invention showing a spacer element formed integrally with the lower fluid tight material layer and sized for nesting with the upper fluid tight material layer shown in FIG. 6a.

FIG. 6c shows a plan view of an enlarged portion of the lower, flexible, fluid-tight material layer and spacer element of FIG. 6b in a sensor region.

FIG. 7b shows and enlarged portion A taken from a sensor area of FIG. 7a.

FIG. 7c shows and enlarged portion A taken from a sensor area of FIG. 7a.

FIG. 12b shows a cross sectional view of the embodiment shown in FIG. 12a.

DETAILED DESCRIPTION OF THE INVENTION

As previously discussed, the invention is a separation element for a pressure compensation vessel, a pressure reservoir or a pulsation damper, wherein the separation element is of a multi-layer structure with at least two mutually superposed flexible, fluid-tight material layers, and at least one spacer element which is arranged between the flexible, fluid-tight material layers and holds them at a spacing relative to each other. The at least one spacer element is such that the space between the flexible, fluid-tight material layers is adapted at least region-wise for fluid to flow therethrough, and wherein in a region, usually and edge region, of the multi-layer structure, the separation element has a sensor region which is in a communication through which fluid can flow with the remaining space between the flexible, fluid-tight material layers.

The sensor region is such that upon an increase in the pressure by virtue of an inflow of fluid between the flexible, fluid-tight material layers of the separation element the flexible, fluid-tight material layers increase their spacing relative to each other in the portion of the sensor region.

The mode of operation of the separation element according to the invention (also referred to a safety separation element) is as follows. As soon as one of the at least two mutually superposed flexible, fluid-tight material layers of the multi-layer structure involves a defect through which the adjoining medium or fluid can penetrate, such as for example a tear or a defect by virtue of porosity or corrosion, the fluid penetrates into the space between the flexible, fluid-tight material layers which are held at a spacing relative to each other by the spacing element. The fluid is distributed in the space between the material layers and flows into the sensor region provided on the separation element. What is essential to the invention in that respect is the spacer element which must ensure through-flow capability in the space between the flexible, fluid-tight material layers. By virtue of the penetration of fluid thereinto the pressure between the flexible, fluid-tight material layers rises overall and thus also in the sensor region. The sensor region is such that the material layers move away from each other in the portion of the sensor region due to the increase in pressure, that is to say the spacing thereof relative to each other is increased. That can be ensured in various ways as will be described in greater detail hereinafter. By way of example, in the sensor region, at least one of the flexible, fluid-tight material layers can be more easily deformable than in the other regions of the separation element insofar as that region of the material layer is of a smaller thickness or consists of a more flexible material. The increase in the spacing between the material layers in the sensor region is detected as a signal indicating an increase in pressure between the flexible, fluid-tight material layers of the separation element and thus a defect in respect of one of the material layers. Detection of that signal is effected mechanically by means of a sensor which records the increase in the spacing between the material layers in the sensor region as a movement and then forwards that signal in a manner known in respect of such sensors as an indication of a defect in the separation element. As the separation element is of a multi-layer structure and generally initially only one material layer becomes defective, the separation element still remains operational for a prolonged period of time, at the moment in time at which the defect is detected. It can then be replaced at the next possible moment in time, for which purpose the pressure compensation vessel, the pressure reservoir or the pulsation damper is usually disconnected from the conduit system. At the moment in time of the defect therefore no fluid passes through the separation element out of a chamber of the pressure compensation vessel, the pressure reservoir or the pulsation damper into the other chamber and becomes mingled with the other fluid.

Similarly multi-layer structures with mutually superposed flexible, fluid-tight material layers and a sensor region, as is provided for the separation element according to the invention, are already known for diaphragm pumps. A substantial difference in respect of the separation element according to the invention in relation to such pump diaphragms however is the provision of a spacer element between the flexible, fluid-tight material layers. In the case of pump diaphragms with two mutually superposed, flexible, fluid-tight material layers, a liquid can easily spread out between the diaphragm layers in the event of a rupture in one of the diaphragm layers, and the liquid can reach the sensor region as the pump diaphragm performs suction and compression stroke movements at a high frequency and during the suction stroke of the pump diaphragm the diaphragm layers are pulled apart so that a gap through which liquid can readily flow is constantly produced between the individual diaphragm layers.

In contrast thereto, a separation element for a pressure compensation vessel, a pressure reservoir or a pulsation damper performs virtually no or only relatively slow movements, and those involve a very slight degree of deflection. At any moment in time a positive pressure is exerted from the exterior on the material layers from both sides by liquid or gas so that the material layers are pressed together. That is the case even in the event of a rupture in one of the material layers. By virtue thereof, in the event of a defect in one of the flexible, fluid-tight material layers a liquid or a gas could not spread out, or could not spread out to an adequate degree, between the material layers, and reach the sensor region. In accordance with the invention therefore it is provided that the material layers are held at a spacing relative to each other by the spacer element according to the invention and the spacer element is such that it ensures a fluid through-flow capability. It is only in that fashion that the arrangement ensures that, in the event of a defect in one of the two flexible, fluid-tight material layers, inflowing fluid can quickly penetrate to the sensor region and the defect is detected before possibly also the other material layer becomes defective and the separation element then completely loses its functionality.

In a preferred embodiment of the separation element according to the invention the at least one spacer element is in the form of a woven material, knitted material and/or fiber material through which fluid can flow. That ensures that the flexible, fluid-tight material layers are held at a spacing relative to each other and thus a space is provided between those material layers and fluid can spread out in that space to the sensor region.

In a further preferred embodiment of the separation element according to the invention the at least one spacer element is in the form of a film, preferably a PTFE film, which for a fluid through-flow capability is provided at least region-wise with slots, openings, embossings, raised portions, recesses and/or wave forms. Those elements on a film, which ensure that a fluid can flow therethrough, are desirably such that they ensure fluid flow paths from almost all regions of the separation element to the sensor region. By way of example, in the case of a separation element in the form of a circular disk, they can be radially and/or concentrically extending slots in the film, wherein at least one further slot provides a fluid communication with the sensor region. Instead of continuous slots, it is also possible to provide in the film openings, embossings, raised portions or recesses which afford the fluid through-flow capability. Furthermore the film can be produced as such with wave forms or other irregularities which provide corresponding spaces for a through-flow of fluid between the material layers. In that case it is necessary for the film to afford sufficient stiffness so that the wave forms or other irregularities are not pressed flat by the pressure acting on the material layers from the exterior on both sides.

In a further embodiment of the separation element according to the invention the at least one spacer element in the form of raised portions or knobs at one or both of the at least two mutually superposed flexible, fluid-tight material layers. That has the advantage that separate material does not have to be introduced with the flexible, fluid-tight material layers but rather the spacing between the material layers and the through-flow capability for fluid are ensured by the corresponding raised portions or knobs which extend from the material layer towards the oppositely disposed material layer.

In a further preferred embodiment of the separation element according to the invention at least one of the two mutually superposed, flexible, fluid-tight material layers is produced in one piece with the at least one spacer element. That is quite particularly advantageous if the spacer element is in the form of raised portions or knobs at one or both of the at least two flexible, fluid-tight material layers. Such raised portions or knobs on one or both of the material layers can also already be formed thereon in the production thereof.

In a further preferred embodiment of the separation element according to the invention the at least two mutually superposed, flexible, fluid-tight material layers and the at least one spacer element are fixedly joined together over the full surface area involved or in portion-wise manner, except in a portion of the sensor region. Such a join is preferably effected by gluing, vulcanizing or welding the spacer element to one or both of the material layers. That ensures that the flexible, fluid-tight material layers and the spacer element remain fixedly joined together and do not lift away from each other both in operation and also in the effect of a defect in one of the material layers. Particularly in the event of a defect in one of the material layers, that has the further advantage that the increased pressure in the event of a defect does not already urge the flexible, fluid-tight material layers away from each other outside the sensor region, but only in the sensor region, and that ensures that a defect is particularly quickly indicated, with a high degree of deflection in terms of the increase in spacing in the sensor region.

Furthermore, it is particularly desirable in accordance with the invention if the separation element at the edge region of the multi-layer structure has at least one clamping region for fixing the separation element in a pressure compensation vessel, pressure reservoir or pulsation damper and for fluid-tight separation of a space, filled with a gas, of the pressure compensation vessel, pressure reservoir or pulsation damper, from a space thereof, which is filled with gas or liquid. It is particularly advantageous if the sensor region is arranged in that clamping region.

Separation elements according to the invention can be of different forms depending on the respective nature and structure of a pressure compensation vessel, a pressure reservoir or a pulsation damper. The separation element, in a plan view from above, is particularly advantageously substantially in the form of a circular disk. To separate the spaces or chambers in a pressure compensation vessel, pressure reservoir or pulsation damper the separation element is then clamped in its edge region, that is to say the clamping region, between two flange elements. It is particularly desirable if, in that edge region or clamping region, the separation element is provided with sealing lips or ridges which ensure fluid-tight integrity between the outsides of the clamping region and the flange element. If the sensor region of the separation element is arranged in the clamping region, a corresponding sensor can also be easily mounted to the flange element which engages the clamping region, which sensor is then provided directly at the sensor region of the separation element for detecting a mechanical deflection of at least one of the material layers.

Alternatively, in the case of a separation element which is substantially in the form of a circular disk, the sensor region can also be arranged in a portion of the separation element, which extends outwardly from the edge region of the circular disk. In that case the corresponding sensor can be provided outside the clamping flange. If for example a pressure compensation vessel, pressure reservoir or pulsation damper comprises two housing halves, between which the separation element is clamped in the clamping region in sealing relationship, then the sensor region of the separation element can protrude out of the housing of the pressure compensation vessel, pressure reservoir or pulsation damper and the sensor can be fitted from the exterior.

The separation element according to the invention can also be of a substantially cylindrical or hose-shaped configuration, in which case it is then desirable that clamping regions are provided at each of the two ends of the cylindrical or hose-shaped separation element in the edge region. Desirably, the edge regions of such a cylindrical or hose-shaped separation element extend radially outwardly at the respective ends in relation to the longitudinal axis, thereby permitting the end portions to be more easily clamped by means of flanges.

In a further embodiment of the separation element according to the invention it is in the form of a bubble or bag or a balloon having a through opening to the interior of the bubble or the balloon. Usually a pressure compensation vessel, pressure reservoir or pulsation damper with a separation element in bubble form or balloon form is a vessel with an opening, at which the separation element is clamped in place. The vessel itself will be of a larger internal volume than the bubble-form or balloon-form separation element and the gas absorbing the pressure will be disposed in the interior of the bubble-form or balloon-form separation element. The space between the outside of the bubble-form or balloon-form separation element and the inside walls of the vessel will communicate with the conduit system in which is disposed the liquid or the gas whose pressure is to be compensated or whose pulsation is to be damped.

The sensor region of the separation element according to the invention, like the remaining region of the separation element, has two mutually superposed, flexible, fluid-tight material layers. Usually those material layers of the sensor region are integrally joined to the material layers of the remaining region of the separation element or are produced in one piece therewith and from the same material. Alternatively however they can comprise a different material and can be attached to the flexible, fluid-tight material layers of the remaining region of the separation element. The spacer element according to the invention can also be provided between the flexible, fluid-tight material layers in the sensor region. It is desirable however if no spacer element is provided in the sensor region so that there is a larger cavity present in the sensor region.

As has already been stated hereinbefore, it is desirable in accordance with the invention if at least one of the at least two mutually superposed, flexible, fluid-tight material layers is adapted to be more easily deformable under pressure in the sensor region of the separation element, than in the other regions of the separation element. That can be effected by virtue of a smaller thickness of material or by the selection of a material with a higher level of elasticity than the material of the material layers in the remaining region of the separation element. It is adequate and advantageous in accordance with the invention if only one of the material layers is of a higher degree of deformability in the sensor region, than the material layers in the remaining regions of the separation element, as an increase in the spacing between the material layers in the sensor region will be detected only from one side outside the separation element. The other material layer in the sensor region will advantageously bear in the clamped condition in a pressure compensation vessel, pressure reservoir or pulsation damper against a fixed support so that deflection in the sensor region takes place only in one direction.

Besides the separation element according to the invention the invention also concerns a pressure compensation vessel, pressure reservoir or pulsation damper having a separation element according to the invention of the above-described kind for fluid-tight separation of a space filled with a gas from a space filled with gas or liquid of a pressure compensation vessel, pressure reservoir or pulsation damper, and a sensor which is arranged at the sensor region of the separation element and which responds to a deformation of at least one of the at least two mutually superposed, flexible, fluid-tight material layers in the portion of the sensor region.

Further advantages, features and embodiments of the separation element according to the invention and the pressure compensation vessel, pressure reservoir or pulsation damper according to the invention will now be described by means of the embodiments by way of example hereinafter and the related Figures. It should be clear that all individual features of described embodiments of separation elements according to the invention can also be applied to other embodiments of separation elements according to the invention and combined therewith insofar as that is technically possible, which the man skilled in the art will realize. Features described for given embodiments are therefore not restricted to the specifically described embodiment but can be combined with all other features of separation elements according to the invention from the description.

In the Figures identical parts or parts which correspond to each other in terms of their function are denoted by the same references.

Figures 1A, 1B, 1C:
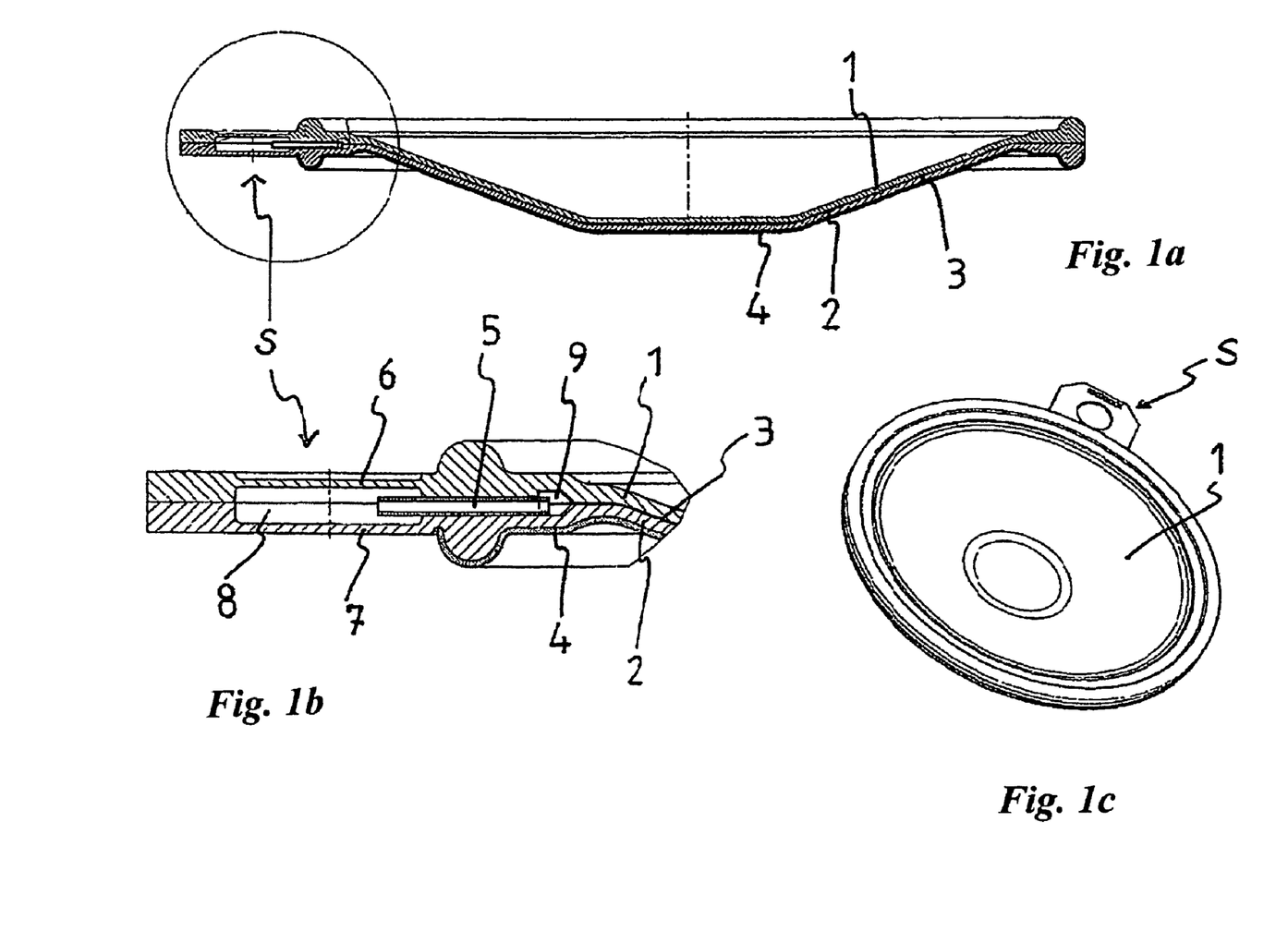
FIG. 1*a* shows a separation element according to the invention for a pressure compensation vessel, a pressure reservoir or a pulsation damper in cross-section from the side.
FIG. 1*b* shows, a view on an enlarged scale of a sensor portion S from FIG. 1*a* in a sensor region.
FIG. 1*c* shows the separation element of FIG. 1*a* and a perspective view of from above.

FIGS. 1*a*-2*b* show an embodiment of the separation element according to the invention for a pressure compensation vessel, a pressure reservoir or a pulsation damper in cross-section from the side (FIG. 1*a*), a view on an enlarged scale of a portion thereof in the sensor region S (FIG. 1*b*) and a perspective view of the separation element obliquely from above (FIG. 1*c*). The separation element includes a first flexible, fluid-tight material layer 1 comprising an elastomer, a second flexible, fluid-tight material layer 2 comprising an elastomer and a spacer element 3 which is arranged therebetween and which provides a spacing between the material layers 1 and 2 and through which fluid can flow. In the embodiment illustrated in FIG. 1 the spacer element 3 is a woven material through which fluid can flow. The lower flexible, fluid-tight material layer 2, in the embodiment illustrated in FIGS. 1*a*-2*b*, is additionally provided on the outside with a protective film 4 of PTFE (polyfluoroethylene) in order to protect the material layer 2 from chemical attack and corrosion by the fluid which comes into contact with the separation element.

The sensor region S which is shown on an enlarged scale in FIG. 1*b* has portions 6 and 7 of the material layers, which are provided integrally with the material layers 1 and 2 and in which the material is thinner than in the remaining regions of the separation element. Formed between those portions 6 and 7 of the material layers is a space 8 which is in communication by way of a communicating passage 5 with a further cavity 9 which directly adjoins the assembled material layers 1 and 2 and the spacer element 3.

If a leak occurs in one of the material layers 1 and 2, for example by virtue of a rupture of one of the material layers, then fluid flows between the material layers 1 and 2 by virtue of the high external pressure. By virtue of the spacer element 3 which holds the flexible, fluid-tight material layers 1 and 2 at a spacing relative to each other and provides a space which has a through-flow capability for fluid, the penetrating fluid (gas or liquid) spreads out between the material layers 1 and 2 and penetrates into the space 8 between the reduced-thickness portions 6 and 7 of the material layers 1 and 2 by way of the cavity 9 and the communicating passage 5. As the portions 6 and 7 of the material layers 1 and 2 are of the same material but are thinner, they have a higher level of flexibility than the material layers 1 and 2 in the other regions of the separation element. The portions 6 and 7 of the material layers are urged away from each other, caused by the ingress of fluid and the concomitant increase in the internal pressure between the material layers. That expansion of the portions 6 and 7 in the sensor region S can be recorded mechanically by way of a sensor arranged on the outside of one of the portions 6 or 7, as a signal denoting a defective separation element, and can be passed on.

Figures 2A, 2B:
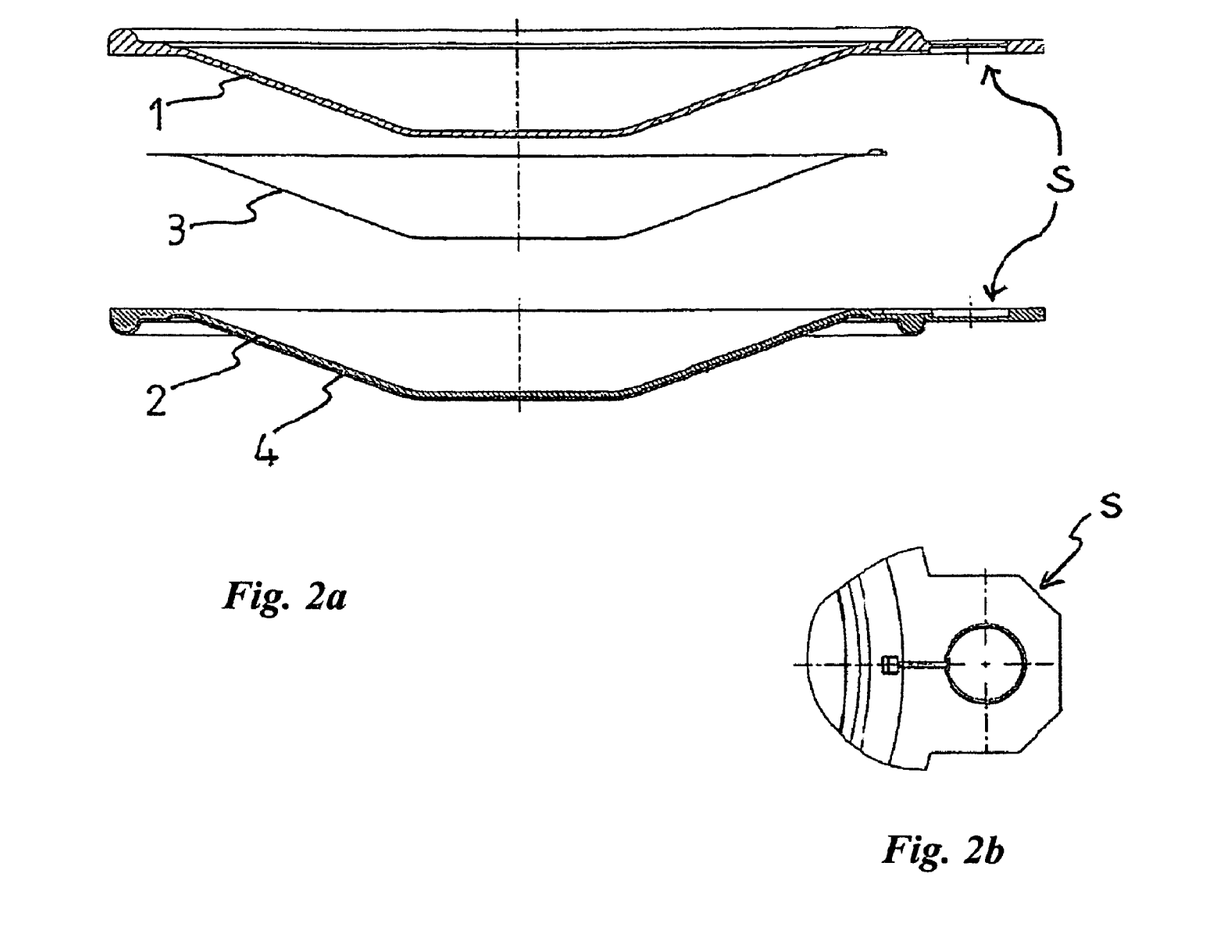
FIG. 2*a* shows the flexible, fluid-tight material layers and the spacer element of the separation element according to the invention as shown in FIG. 1*a* in cross-section and separated from each other.
FIG. 2*b* shows a top plan view on an enlarged scale of a sensor portion S of the separation element of FIG. 2*a*

FIG. 2a shows the flexible, fluid-tight material layers 1 and 2 and the spacer element 3 of the separation element according to the invention as shown in FIG. 1a in cross-section and separated from each other. Furthermore FIG. 2b shows a plan view on an enlarged scale of a portion of the lower flexible, fluid-tight material layer in the sensor region S.

Figure 3:
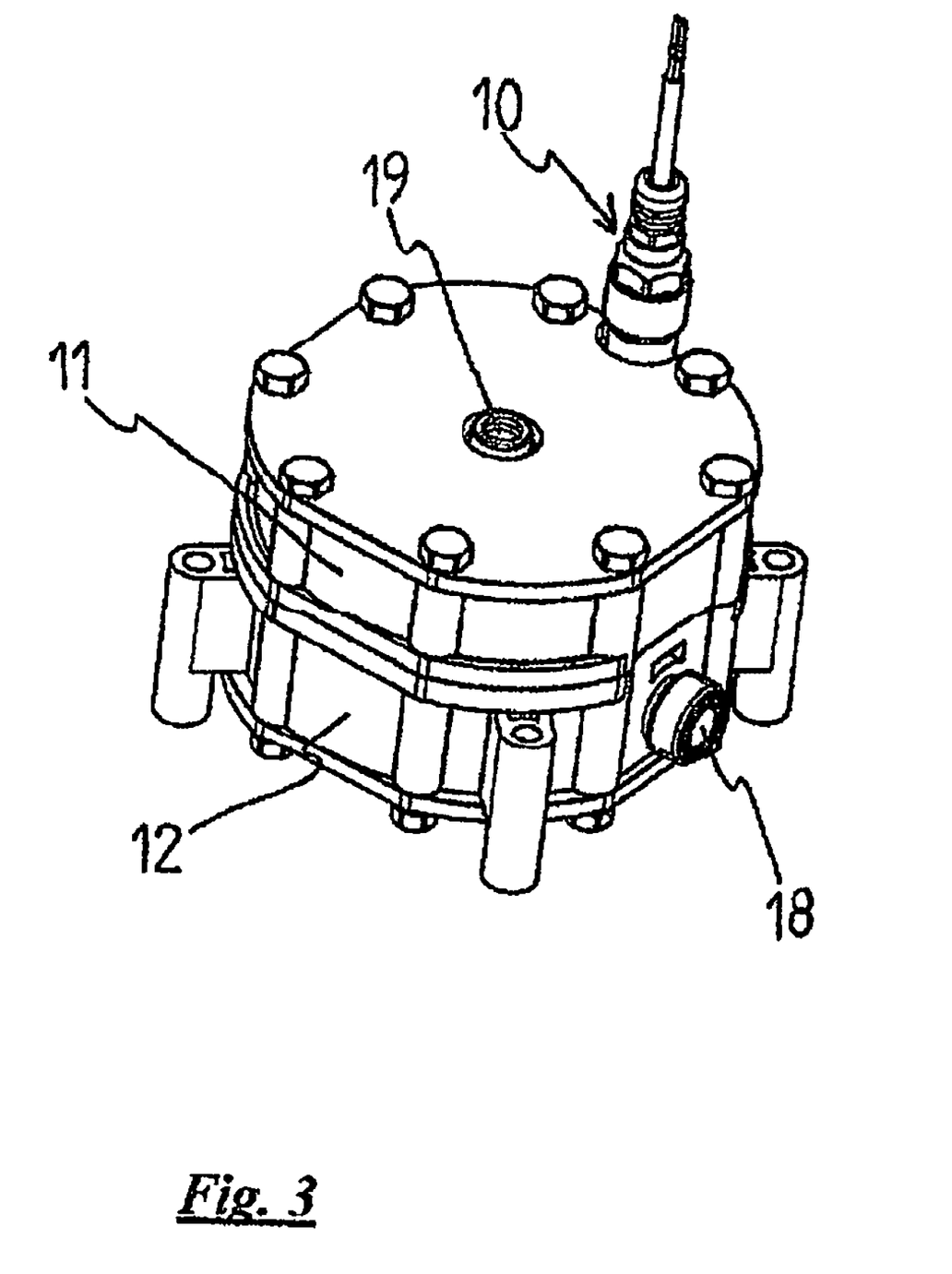
FIG. 3 shows a perspective view obliquely from above of a pressure compensation vessel, a pressure reservoir or a pulsation damper having the separation element according to the invention as shown in FIG. 1.

FIG. 3 shows a pressure compensation vessel, a pressure reservoir or a pulsation damper having the separation element according to the invention as shown in FIGS. 1a-2b, in a perspective view obliquely from above. The pressure compensation vessel, the pressure reservoir or the pulsation damper as shown in FIG. 3 has an upper housing half 11 and a lower housing half 12, between which the separation element is clamped. In addition, disposed in the upper housing half 11 is a sensor 10 which extends in the interior of that upper housing half 11 to over the sensor region S of the separation element.

Figure 4A:
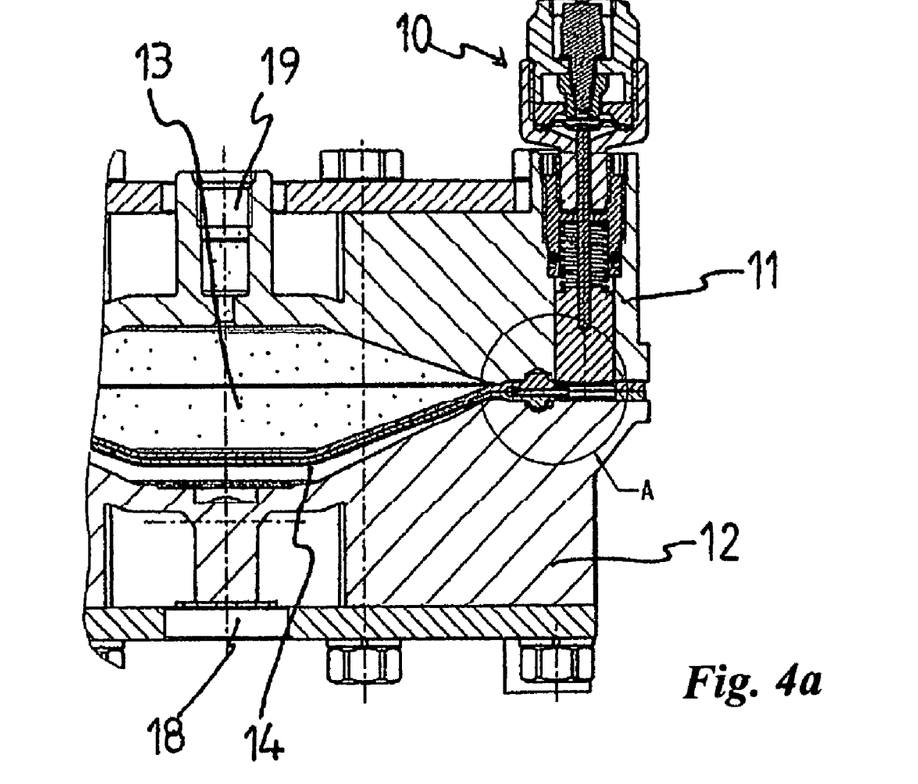
FIG. 4*a* shows the pressure compensation vessel, the pressure reservoir or the pulsation damper of FIG. 3 in cross-section in a broken-away view.
Figure 4B:
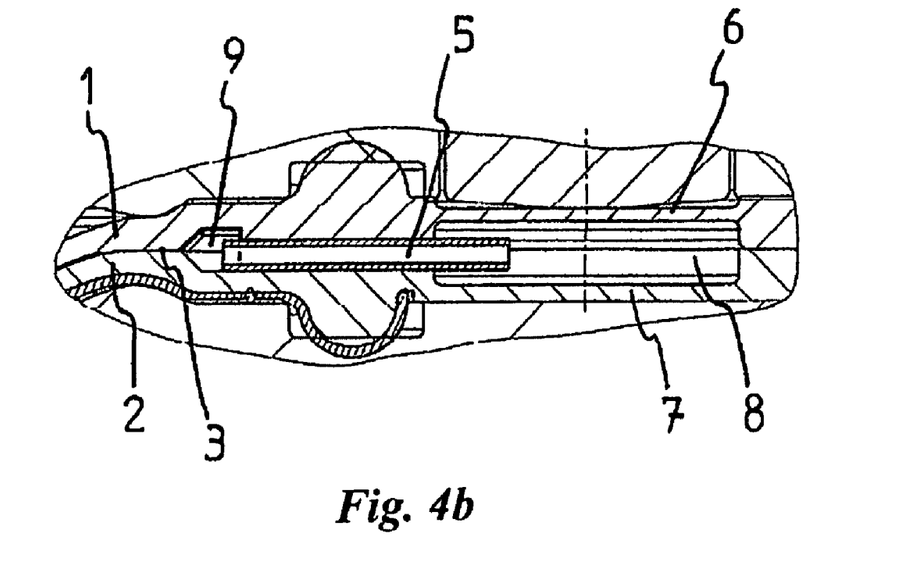
FIG. 4*b* shows a magnified view of a sensor portion of the separation element of FIG. 4*a*.

FIG. 4a shows the pressure compensation vessel, the pressure reservoir or the pulsation damper as shown in FIG. 3 in cross-section in the form of a broken-away view and FIG. 4b shows a view on an enlarged scale of a portion in the sensor region S of the separation element according to the invention. Provided in the pressure compensation vessel, pressure reservoir or pulsation damper, above the separation element which is clamped in place between the housing halves 11 and 12, is a pressure or volume compensation chamber 13 which is connected to a supply container for pressure compensation medium by way of a communication 19. The pressure compensation medium can be a liquid or a gas. Preferably the pressure compensation medium is a gas which is kept under a pressure which, depending on the respective operating condition, is greater than, less than or equal to the normal working pressure in the fluid conduit system so that pressure fluctuations in the form of short-term increases in pressure in the fluid conduit system are compensated. Provided beneath the separation element which is clamped in place between the housing halves 11 and 12 is a fluid chamber 14 which is in communication with the fluid conduit system whose pressure fluctuations are to be compensated, by way of a communication 18. The fluid in the fluid conduit system can be a liquid or a gas.

In the embodiment illustrated in FIGS. 4a and 4b the portion 7 in the sensor region S of the material layer 2 bears against a smooth surface of the lower housing half 12 so that the portion 7 cannot bulge out upon an increase in the pressure in the space 8. In contrast provided in the upper housing half 11 above the portion 6 in the sensor region S of the material layer 1 is a through bore in which a sensor 10 extends to directly above the portion 6. The sensor 10 can be designed in many different ways for detecting an outward bulging deflection of the portion 6, because of an increase in pressure in the space 8. Sensors of that kind are known per se and as such are not subject-matter of the invention. Upon an increase in pressure in the space 8 because of a rupture of one of the diaphragm layers 1 or 2, the portion 6 bulges out in the direction of the sensor 10 and presses upwardly the part of the sensor 10, which bears against the portion 6. That movement is transmitted by the sensor as a mechanical and/or electrical signal in respect of a rupture of the material layers 1 and/or 2.

Figures 5A, 5B:
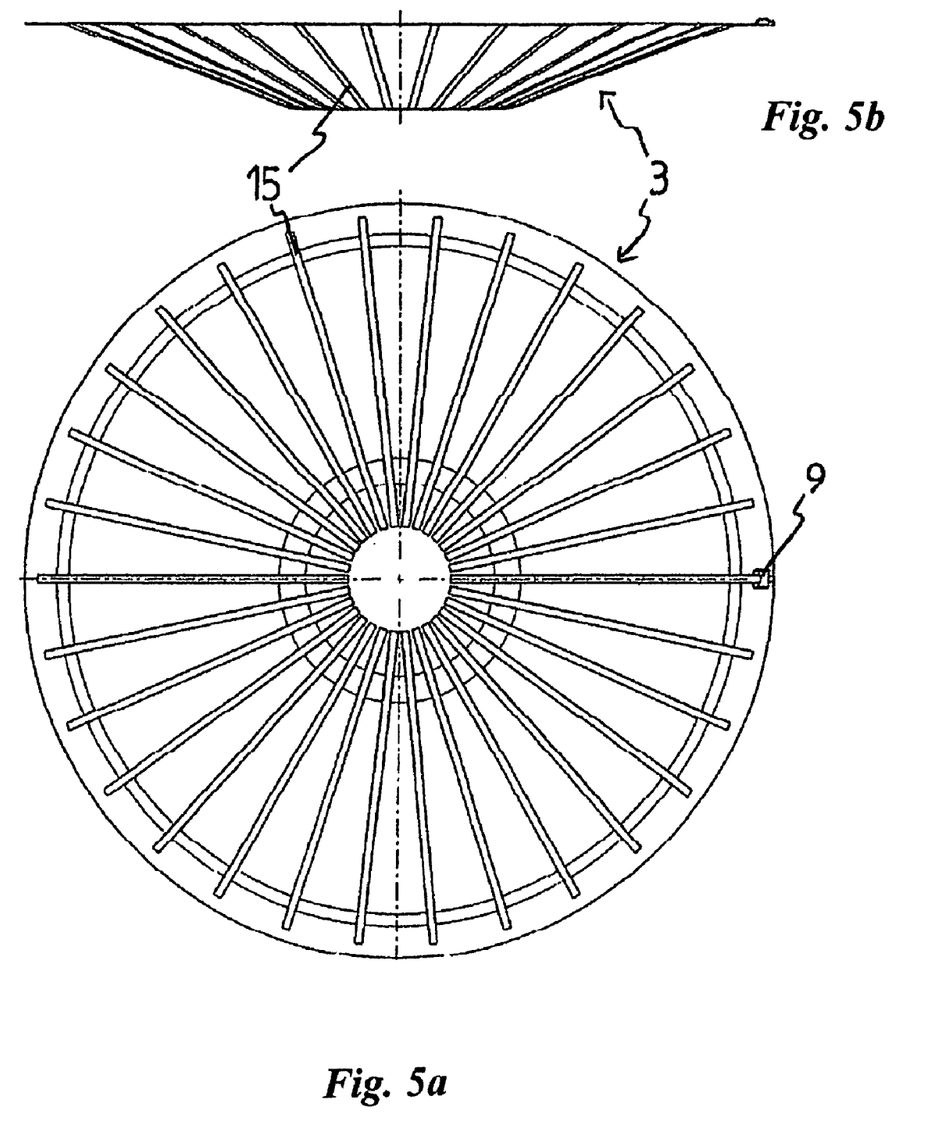
FIG. 5*a* shows a top view of an alternative embodiment of a spacer element of the separation element according to the invention.
FIG. 5*b* shows a side view of the separation element of FIG. 5*a*.

FIGS. 5a and 5b show an alternative embodiment of a spacer element 3 of the separation element according to the invention as a plan view from above and as side a view respectively. The spacer element 3 shown in FIGS. 5a and 5b may be in the form of a PTFE film provided with radially arranged slots 15. If fluid penetrates into the separation element because of a rupture in one of the two flexible, fluid-tight material layers, the fluid spreads out along the radially extending slots 15 between the material layers. In the event of a rupture in an outer region of the material layers the fluid can flow by way of the slots 15 to the center of the separation element and can then spread out by way of further slots by way of the cavity 9 to the sensor region.

Figure 6A:
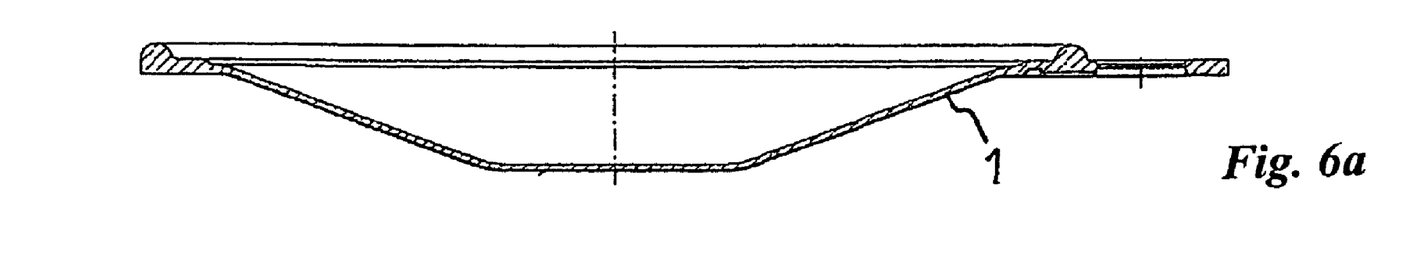
FIG. 6a shows an upper fluid tight material layer of a separation element of the invention.
Figures 6B, 6C:
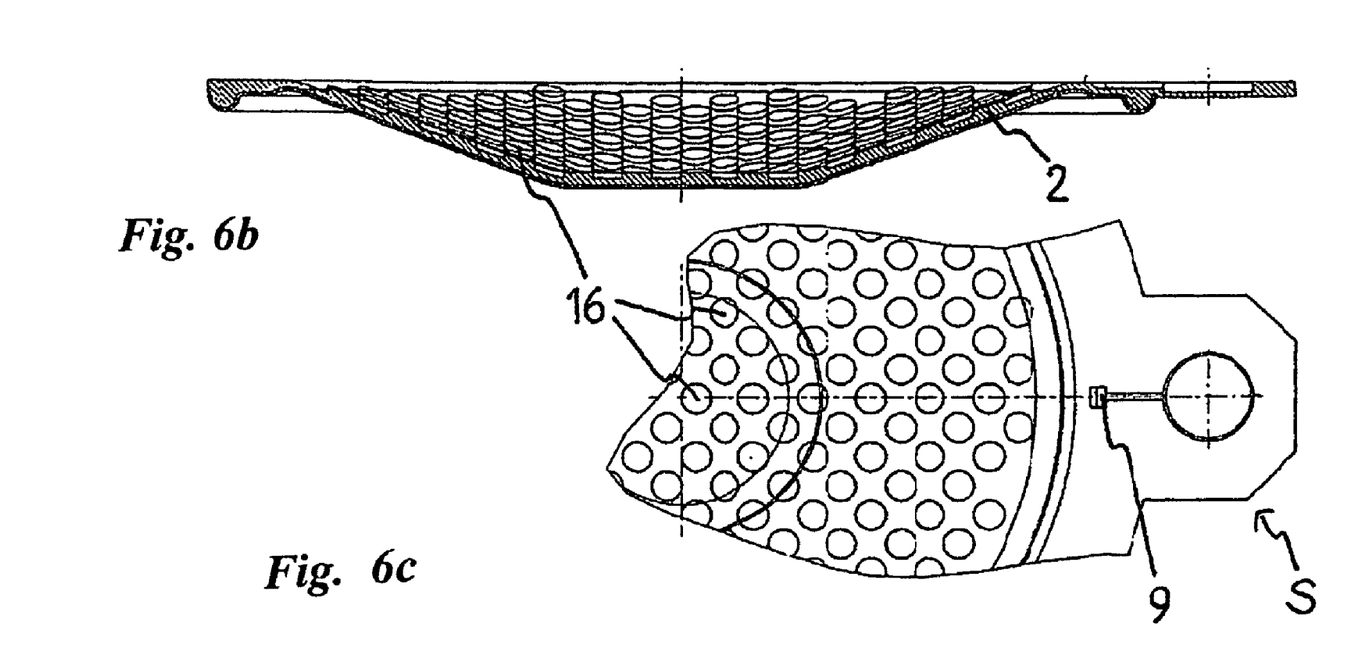

FIGS. 6a-6c show a further alternative embodiment of the separation element according to the invention in which the spacer element 3 is produced integrally with the flexible, fluid-tight material layer 2, more specifically as raised portions provided at the inside surface of the material layer 2, in the form of circular knobs 16. In the assembled condition of the separation element the knobs 16 of the material layer 2 bear against the inside surface of the material layer 1. The intermediate spaces between the knobs 16 provide a space between the flexible, fluid-tight material layers 1 and 2, through which fluid can flow. If fluid penetrates into the separation element because of a rupture in one of the material layers 1 or 2, the fluid spreads out in that space between the material layers and flows by way of the cavity 9 into the sensor region S.

Figure 7A:
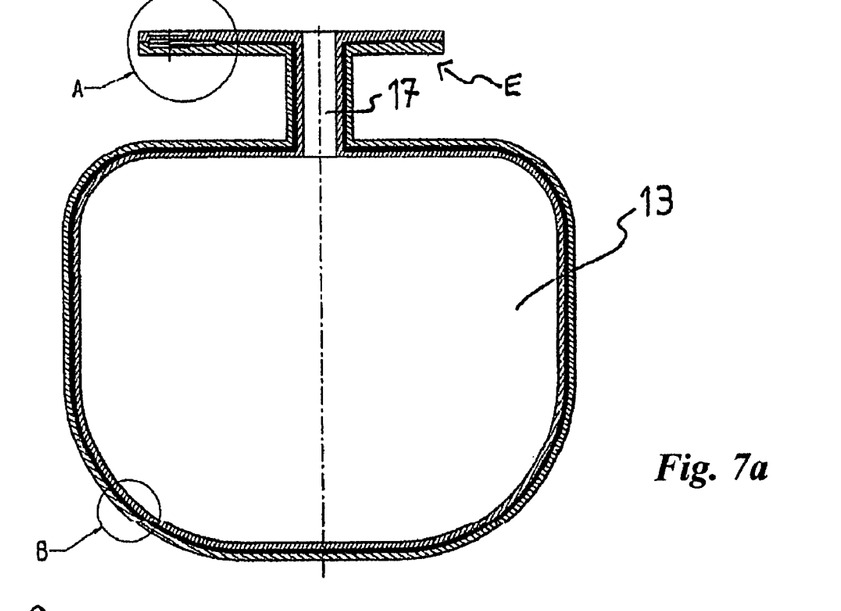
FIG. 7a shows a side cross sectional view of yet a further embodiment of the separation element according to the invention in the form of a bubble, bag or a balloon.
Figure 7B:
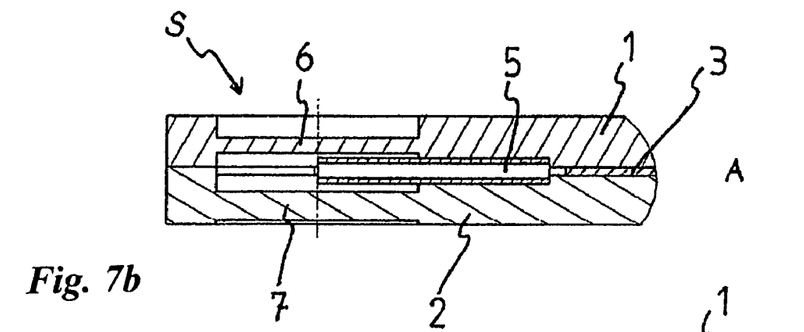
Figure 7C:
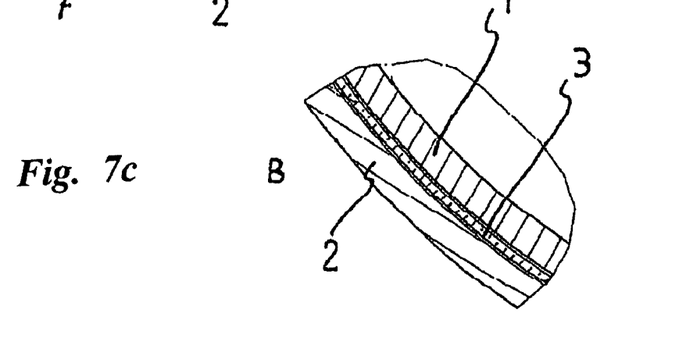

FIGS. 7a-7c, 8 and 9 show a further embodiment of the separation element according to the invention in the form of a bubble or bag or a balloon having a through opening 17 to the interior of the bubble. The interior of the bubble represents the pressure or volume compensation chamber 13. The structure of this separation element includes flexible, fluid-tight material layers 1 and 2 and a spacer element 3 arranged therebetween. Provided at the edge regions of the material layers 1 and 2 is a clamping region E with which the separation element is fluid-tightly clamped in place between corresponding housing portions. FIG. 7b shows a view on an enlarged scale of a portion of the sensor region S which is identified by "A" in FIG. 7a. FIG. 7c illustrates a view on an enlarged scale of a portion of the wall region which is identified by "B" in the upper view in FIG. 7a.

Figure 8:
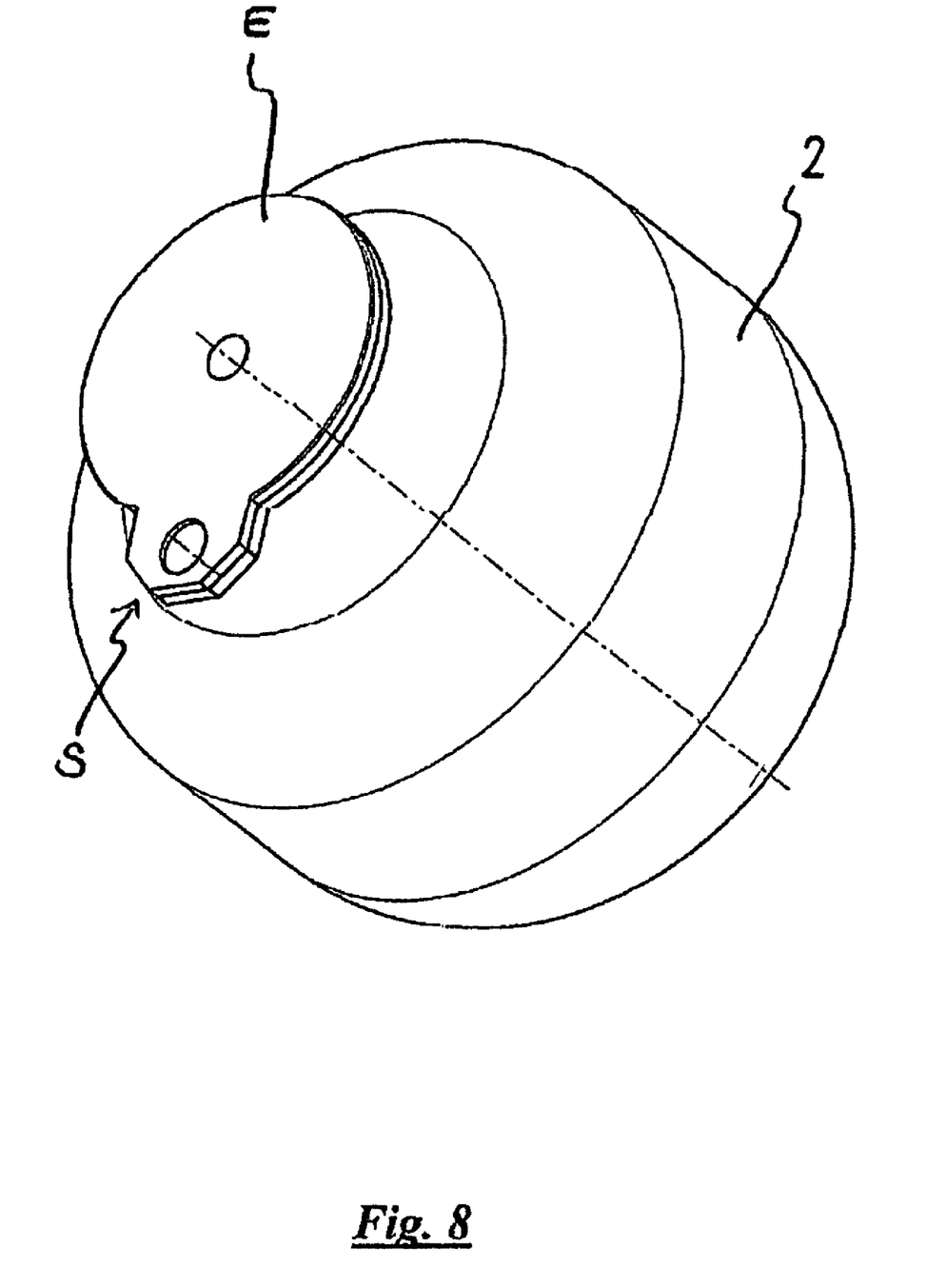
FIG. 8 shows the separation element according to the invention as shown in FIG. 7a in a perspective view of the separation element obliquely from above.

FIG. 8 shows the separation element according to the invention as illustrated in FIGS. 7a-7c in a perspective view obliquely from above.

Figure 9:
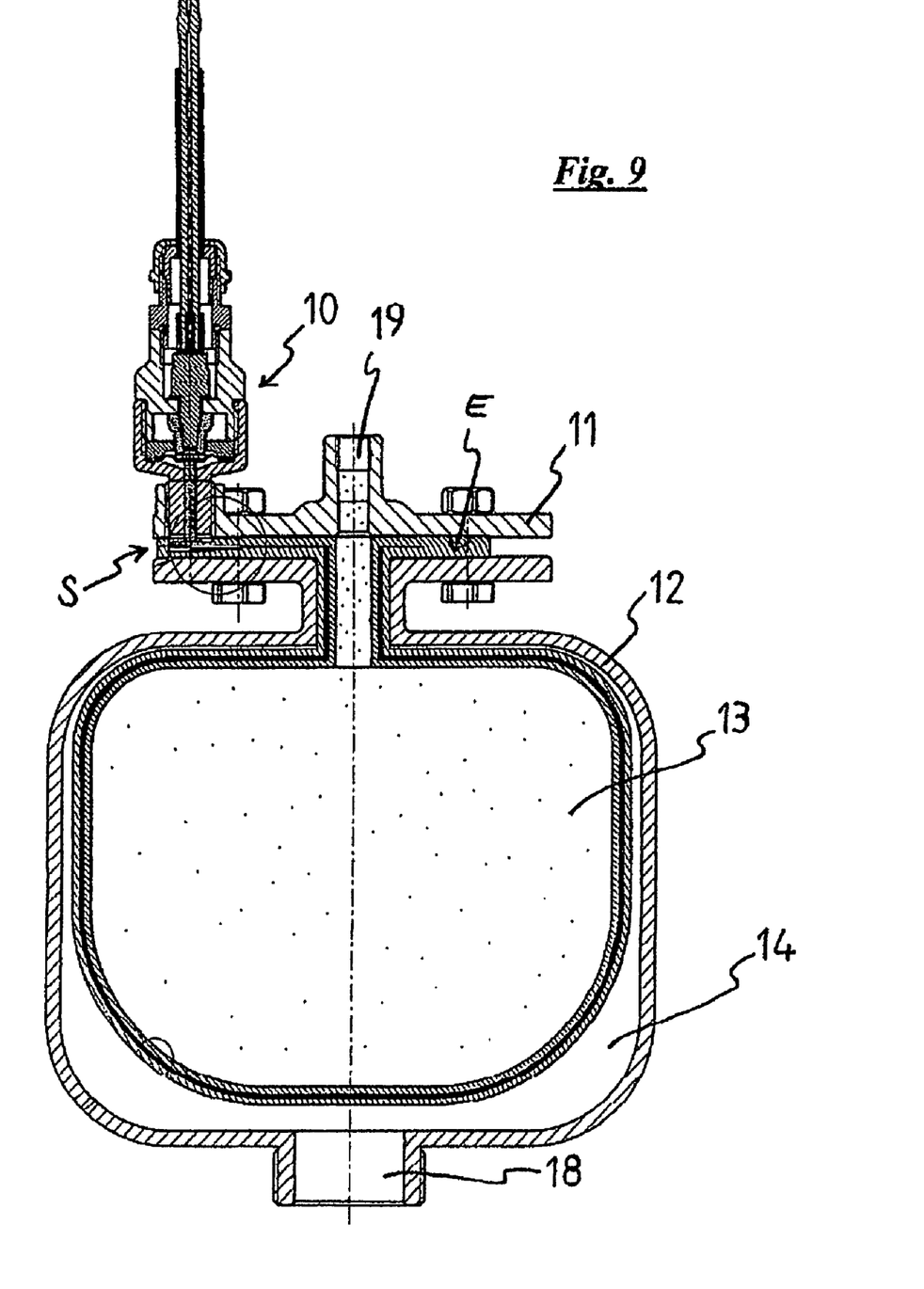
FIG. 9 shows a pressure compensation vessel, a pressure reservoir or a pulsation damper having a separation element according to the invention as shown in FIGS. 7a and 8 in cross-section from the side.

FIG. 9 shows a pressure compensation vessel, a pressure reservoir or a pulsation damper having the separation element according to the invention as shown in FIGS. 7a-7c and 8 in cross-section from the side. The pressure compensation vessel, the pressure reservoir or the pulsation damper includes an upper housing half 11 and a lower housing half 12. The separation element is fluid-tightly clamped in place in the clamping region between the housing halves 11 and 12. Provided at the upper housing half 11 is a bore in which a sensor 10 is arranged, as has already been described hereinbefore. The lower housing half 12 is of an internal volume which is larger than the bubble-form separation element so that between the outside of the separation element and the inside walls of the vessel there is a space, the fluid chamber 14, which communicates with the fluid conduit system by way of a communication 18.

Figure 10A:
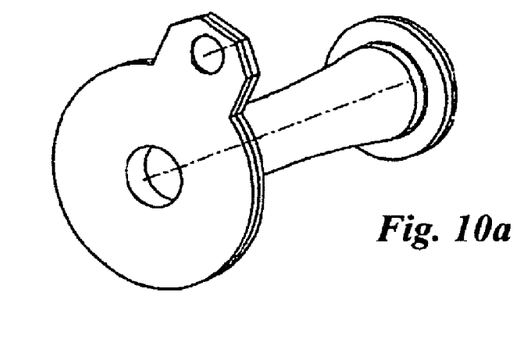
FIG. 10a shows a further alternative embodiment of the separation element according to the invention in a perspective view in which the separation element is of a substantially cylindrical or hose-shaped configuration.
Figures 10B, 10C:
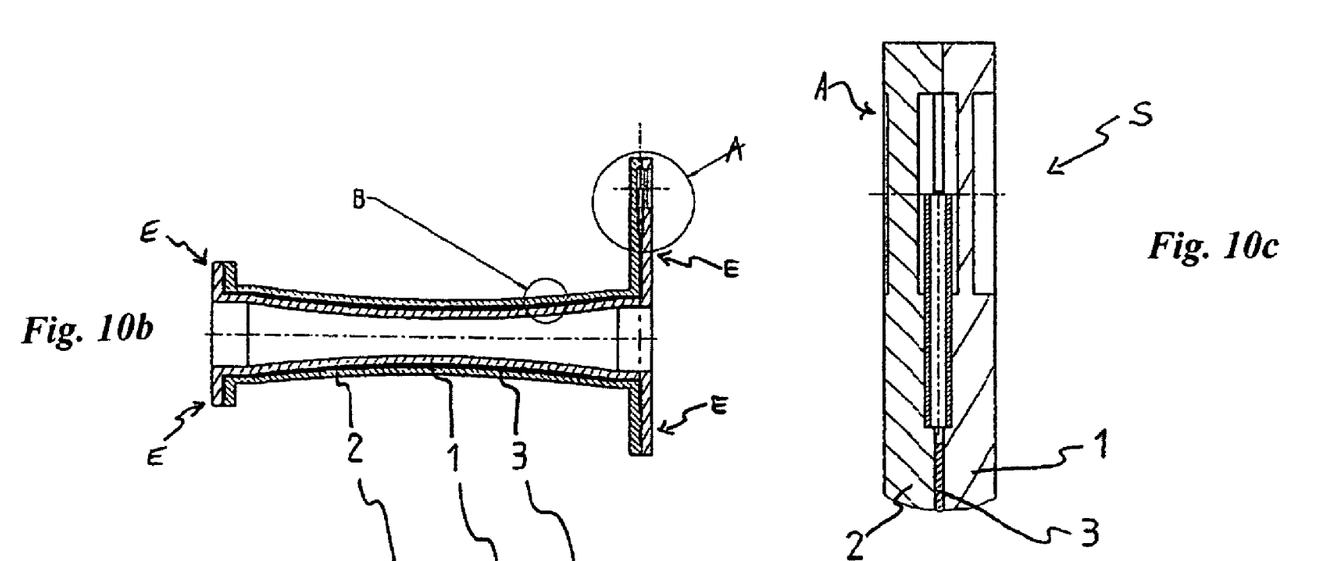
FIG. 10b shows the embodiment of FIG. 10a in cross-section from the side.
FIG. 10c shows a magnified view of a sensor portion A taken from FIG. 10b.

FIGS. 10a-10d show a further alternative embodiment of the separation element according to the invention, in which the separation element is of a substantially cylindrical or hose-shaped configuration. FIG. 10a shows a perspective view of the separation element obliquely from above. FIG. 10b shows the separation element in cross-section from the side.

Figure 10D:
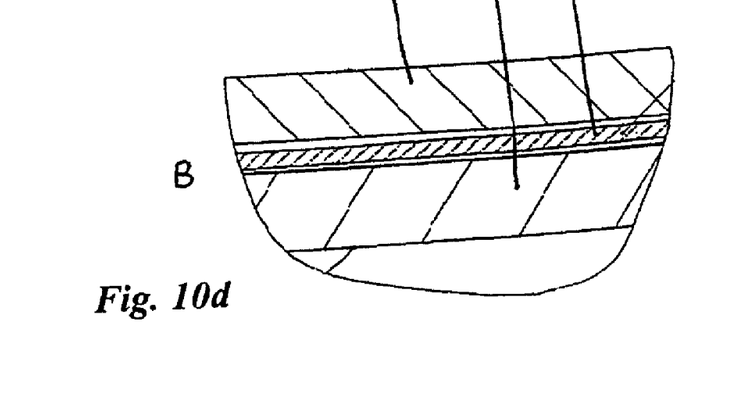
FIG. 10d shows a magnified view of section B taken from FIG. 10b.

FIGS. 10c and 10d show views on an enlarged scale of the regions which are identified by "A" and "B" in FIG. 10b The separation element shown in FIGS. 10a and 10b has clamping regions E on both sides, which extend radially with respect to the longitudinal axis of the separation element. The sensor region S arranged on one side of the separation element is substantially of the configuration as has already been described hereinbefore.

Figure 11:
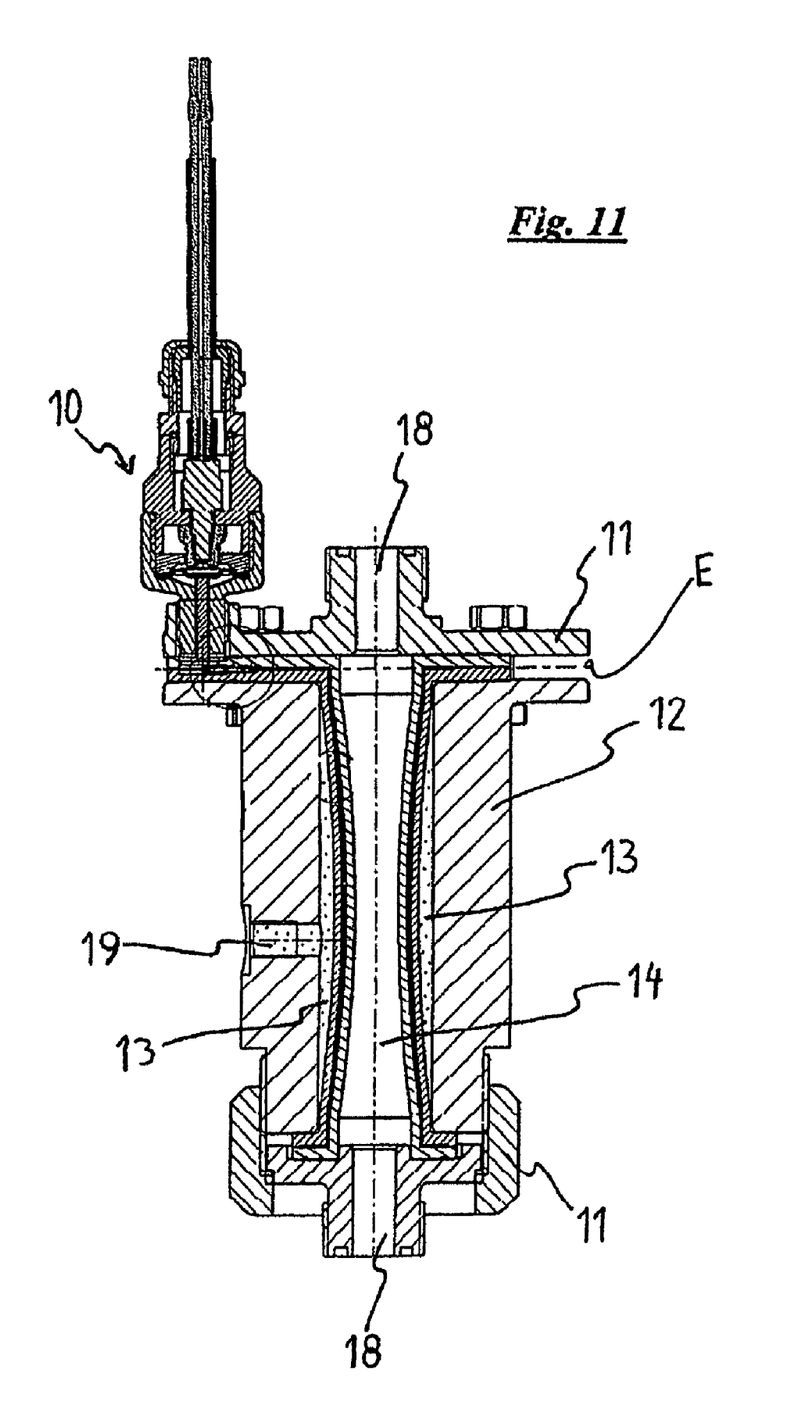
FIG. 11 shows a pressure compensation vessel, a pressure reservoir or a pulsation damper having the separation element according to the invention as shown in FIG. 10b in a cross-section from the side.

FIG. 11 shows a pressure compensation vessel, a pressure reservoir or a pulsation damper having the separation element according to the invention as shown in FIG. 10 in cross-section from the side. The separation element is fluid-tightly clamped between housing portions 11 and 12 in the clamping regions E. Provided between the housing portion 12 and the outside of the separation element is a pressure or volume compensation chamber 13 which communicates with a supply container for pressure compensation medium by way of a communication 19. The interior of the separation element represents the fluid chamber 14 which in operation communicates with the conduit system whose pressure is to be compensated or whose pulsation is to be damped. The embodiment of the cylindrical or hose-shaped separation element shown in FIGS. 10 and 11 can be integrated into a conduit system directly for a through-flow of liquid or gas. For that purpose, connections 18 to the fluid conduit system are provided on the housing portions 11.

Figure 12A:
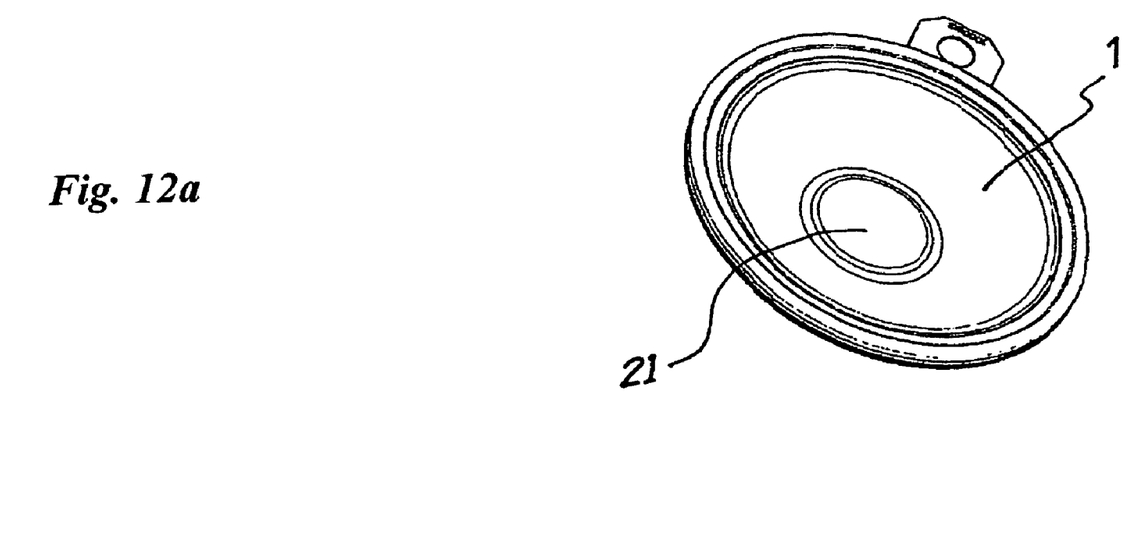
FIG. 12a shows yet another embodiment a separation element of the invention in a perspective view obliquely from above wherein the separation element additionally has a stiffening element or support element in a central region.
Figure 12B:
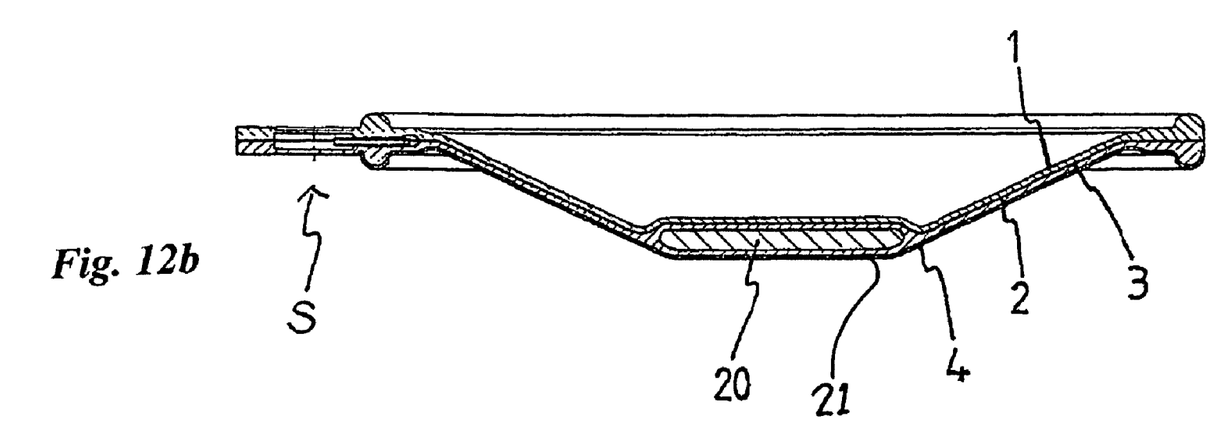

FIGS. 12a and 12b show an alternative embodiment of the separation element according to the invention which essentially differs from the embodiment shown in FIG. 1a in that, in a central region 21, it additionally has a stiffening element or support element 20 which is embedded in the lower flexible, fluid-tight material layer 2. The stiffening element or support element 20 imparts additional stability to the separation element. In other respects the separation element as shown in FIG. 12 is designed like the embodiment shown in FIG. 1a.

REFERENCE NUMERALS 1 flexible, fluid-tight material layer
2 flexible, fluid-tight material layer
3 spacer element
4 protective film communicating passage
6 reduced-thickness portion of the flexible, fluid-tight material layer 1
7 reduced-thickness portion of the flexible, fluid-tight material layer 2
8 space
9 cavity
10 sensor
11 upper housing half of pressure compensation vessel, pressure reservoir or pulsation damper
12 lower housing half of pressure compensation vessel, pressure reservoir or pulsation damper
13 pressure or volume compensation chamber
14 fluid chamber slots
16 knobs
17 through opening
18 communication with the fluid conduit system
19 communication with the supply container for pressure compensation medium
20 stiffening element or support element
S sensor region
E clamping region

What is claimed is:

1. A separation element for a pressure compensation in a pressure compensation vessel, pressure reservoir or pulsation damper, wherein the separation element is of a multi-layer structure comprising:

at least two mutually superposed flexible, fluid-tight material layers (1, 2), and at least one spacer element (3) which is arranged between the flexible, fluid-tight material layers and holds them at a spacing relative to each other, wherein the at least one spacer element is such that the space between the flexible, fluid-tight material layers (1, 2) is at least partly adapted for fluid to flow therethrough, and at an edge region of the multi-layer structure the separation element has a sensor region (S) which is in a communication with remaining space between the flexible, fluid-tight material layers through which fluid can flow, wherein within the sensor region, the flexible, fluid-tight material layers are designed so that, by virtue of an inflow of fluid between them, an increase of pressure causes an increase in the spacing between the material layers (1,2) relative to each other.

2. A separation element as set forth in claim 1 wherein at portions of the two mutually superposed, flexible, fluid-tight material layers and the at least one spacer element (3), outside of the sensor region, are fixedly joined together.

3. The separation element of claim 2 wherein the mutually superposed, flexible, fluid-tight material layers and the at least one spacer element (3) are joined together by adhesive or welding.

4. A separation element as set forth in claim 1 wherein the two mutually superposed, flexible, fluid-tight material layers and the at least one spacer element (3), are made in one piece.

5. A separation element as set forth in claim 1 wherein the at least one spacer element (3) is in the form of a woven material, knitted material and/or fiber material through which fluid can flow.

6. A separation element as set forth in claim 4 wherein the at least one spacer element (3) is in the form of a woven material, knitted material and/or fiber material through which fluid can flow.

7. A separation element as set forth in claim 1 wherein the at least one spacer element (3) is in the form of a film provided with slots (15), openings, embossings, raised portions (16), recesses and/or wave forms permitting passage of fluid.

8. A separation element as set forth in claim 1 wherein the at least one spacer element (3) is in the form of raised portions, knobs (16) and/or recesses at a surface of at least one of the mutually superposed flexible, fluid-tight material layers (1, 2).

9. A separation element as set forth in claim 4 wherein the at least one spacer element (3) is in the form of raised portions, knobs (16) and/or recesses at a surface of at least one of the mutually superposed flexible, fluid-tight material layers (1, 2).

10. A separation element as set forth in claim 1 wherein the separation element at the edge region of the multi-layer structure has at least one clamping region (E) for fixing the separation element in a pressure compensation vessel, pressure reservoir or pulsation damper and for fluid-tight separation of a space (13), filled with a gas, of the pressure compensation vessel, pressure reservoir or pulsation damper, from a space (14) thereof, which is filled with gas or liquid.

11. A separation element as set forth in claim 10 wherein the sensor region (S) is arranged in the clamping region (E).

12. A separation element as set forth in claim 1 wherein the separation element in a plan view from above is substantially in the form of a circular disk, wherein the sensor region (S) is arranged in an edge region of the circular disk.

13. A separation element as set forth in claim 1 wherein the separation element in a plan view from above is substantially in the form of a circular disk, wherein the sensor region (S) is arranged in a portion of the separation element which extends outwardly from the edge region of the circular disk.

14. A separation element as set forth in claim 1 wherein the separation element is of a substantially cylindrical or hose-shaped configuration.

15. A separation element as set forth in claim 1 wherein the separation element is in the form of a bubble or a balloon having a through opening to the interior of the bubble or the balloon.

16. A separation element as set forth in claim 1 wherein no spacer element (3) is provided in the sensor region (S) of the separation element between the at least two mutually superposed, flexible, fluid-tight material layers (1, 2).

17. A separation element as set forth claim 1 wherein at least one of the at least two mutually superposed, flexible, fluid-tight material layers (1, 2) is adapted to be more easily deformable under pressure in the sensor region (S) of the separation element than in the remaining regions of the separation element.

18. A separation element as set forth in claim 17 wherein at least one of the at least two mutually superposed, flexible, fluid-tight material layers (1, 2) is of a smaller material thickness for easier deformability under pressure in the sensor region (S) of the separation element than in the remaining regions of the separation element.

19. A separation element as set forth in claim 17 wherein at least one of the at least two mutually superposed, flexible, fluid-tight material layers (1, 2) is of a higher degree of elasticity for easier deformability under pressure in the sensor region (S) of the separation element than in the remaining regions of the separation element.

20. A separation element as set forth in claim 1 wherein disposed at the sensor region (S) of the separation element is a sensor (10) which responds to a deformation of at least one of the at least two mutually superposed, flexible, fluid-tight material layers (1, 2) in the portion of the sensor region (S).

21. A separation element as set forth in claim 1 wherein a stiffening element or support element (20) is additionally provided between the flexible, fluid-tight material layers (1, 2).

22. A pressure compensation vessel, pressure reservoir or pulsation damper having a separation element as set forth in claim 1 for fluid-tight separation of a space (13) filled with a gas from a space (14) filled with gas or liquid of a pressure compensation vessel, pressure reservoir or pulsation damper, and a sensor (10) which is arranged at the sensor region (S) of the separation element and which responds to a deformation of at least one of the at least two mutually superposed, flexible, fluid-tight material layers (1, 2) in the portion of the sensor region (S).

* * * * *